United States Patent [19]
Ikeda et al.

[11] Patent Number: 5,805,484
[45] Date of Patent: Sep. 8, 1998

[54] ORTHOGONAL FUNCTION GENERATING CIRCUIT AND ORTHOGONAL FUNCTION GENERATING METHOD

[75] Inventors: Yasunari Ikeda, Kanagawa; Tamotsu Ikeda, Tokyo; Takahiro Okada, Chiba, all of Japan

[73] Assignee: Sony Corporation, Tokyo, Japan

[21] Appl. No.: 608,611

[22] Filed: Feb. 29, 1996

[30] Foreign Application Priority Data

Mar. 10, 1995  [JP]  Japan .................................. 7-050758

[51] Int. Cl.$^6$ ...................................................... G06F 15/00
[52] U.S. Cl. ...................................................... 364/726.01
[58] Field of Search ........................ 364/726.01, 726.02, 364/754.03; 382/280

[56] References Cited

U.S. PATENT DOCUMENTS

| | | | |
|---|---|---|---|
| 4,344,151 | 8/1982 | White | 364/754.03 |
| 4,354,249 | 10/1982 | Kino et al. | 364/754.03 |
| 4,713,782 | 12/1987 | Blackham | 364/726.01 |
| 4,747,067 | 5/1988 | Jagodnik, Jr. et al. | 364/748.5 |
| 4,893,266 | 1/1990 | Deem | 364/726.01 |
| 5,091,875 | 2/1992 | Wong et al. | 364/754.03 |
| 5,257,213 | 10/1993 | Kim et al. | |
| 5,262,976 | 11/1993 | Young et al. | 364/754.03 |

FOREIGN PATENT DOCUMENTS 0483454  5/1992  European Pat. Off. .

*Primary Examiner*—Tan V. Mai
*Attorney, Agent, or Firm*—Jay H. Maioli

[57] ABSTRACT

In an orthogonal function generating circuit, orthogonal functions are generated with high precision by a small-scale circuit. The circuit uses an orthogonal transformation between time domain digital data and frequency domain digital data to obtain one of the time domain digital data and the frequency domain digital data from the other digital data. The circuit has a first data holder for holding first data and a second data holder for holding second data. A first multiplier multiplies the first data, and a second multiplier multiplies the first data by a second coefficient. A third multiplier multiplies the second data by a third coefficient, and a fourth multiplier multiplies the second data by a fourth coefficient. An adder adds an output of the first multiplier to an output of the third multiplier, and outputs the result of addition so as to feed back the result of addition to the first data holder; and a subtracter subtracts an output of the second multiplier from an output of the fourth multiplier and for outputs the result of subtraction so as to feed back the result of subtraction to the second data holder.

14 Claims, 5 Drawing Sheets

BASIC CIRCUIT ARRANGEMENT FOR FFT BUTTERFLY CALCULATION

ORTHOGONAL FUNCTION GENERATING CIRCUIT AND ORTHOGONAL FUNCTION GENERATING METHOD

BACKGROUND OF THE INVENTION

The present invention generally relates to an orthogonal function generating circuit and an orthogonal function generating method. More specifically, the present invention is directed to such orthogonal function generating circuit and orthogonal function generating method suitably employed in an orthogonal transforming circuit, e.g., a fast Fourier transforming (FFT) circuit.

Conventionally, as algorithms used to Fourier-transform a discrete time series data, or inverse-Fourier-transform a frequency series data, the discrete Fourier transform (hereinafter simply referred to as a "DFT") and the inverse discrete Fourier transform (hereinafter simply referred to as an "IDFT") are known. The former transformation implies that N time series data [x0, - - - , x(N−1)] are transformed into the corresponding frequency series data [y0, - - - , y(N−1)] in accordance with formula (1). The latter transformation implies that N data [y0, - - - , y(N−1)] are inverse-transformed in accordance with formula (2). That is, $$Y_k = \sum_{n=0}^{N-1} X_n W^{nk} \quad (1)$$

$$X_k = \frac{1}{N} \sum_{n=0}^{N-1} Y_n W^{-nk} \quad (2)$$

where $W^n$ is $$W^n = e^{-j2\pi n/N} \quad (3).$$

As a consequence, when the frequency series data is derived from the time series data, formula (1) is calculated, whereas when the time series data is derived from the frequency series data, formula (2) is calculated. These calculations are those of sum of products for which each of the input series data are weighted by a complex coefficient of the orthogonal function given by formula (3). Specifically, this orthogonal function must be calculated to produce the weighting coefficient.

As is well known, since the number of multiplications is increased in the DFT (Discrete Fourier Transform), the fast Fourier transformation (hereinafter simply referred to as an "FFT") has been proposed as the algorithm used to reduce the amount of calculation. Also, the inverse fast Fourier transformation (hereinafter simply called as an "IFFT") corresponding to the inverse transformation has been proposed. These FFT and IFFT are techniques for calculating discrete time series data and frequency series data at high speeds, and various algorithms have been proposed. Typical algorithms include frequency thinning and time thinning.

FIG. 1 schematically represents the calculation algorithm by way of the frequency thinning as an example of 16-point FFT. In this calculation algorithm, symbol "$W^m$" indicates the weighting function defined by formula (3). In this 16-point FFT, sixteen data [x0, - - - , x15] are inputted as the time domain data, and sixteen data [y0, - - - , y15] are obtained as outputs. In the FFT algorithm, a butterfly calculation is used as a basic calculation. For instance, a combination of two input data of x0 and x8 is butterfly-calculated to thereby obtain a combination of data of x'0 and x'8 in the next stage, and combinations of the input data are successively butterfly-calculated to obtain combinations of the corresponding data in the subsequent stages.

In FIG. 2, there is shown a principle of this butterfly calculation. As shown in this drawing, each of the combination of two input data of x0 and x8 are added (x0=x8), or subtracted (x0−x8) in an adder 71 and a subtracter 72, and an added result (x0+x8) is directly outputted whereas a subtracted result (x0−x8) is multiplied by an orthogonal function $W^n (=e^{-j2\pi n/N})$ by a multiplier 73 to be outputted, so that a combination of two output data (x'0 and x'8) is obtained.

As apparent from FIG. 1, in this butterfly calculation, values of "n" in the orthogonal function $W^n$ are different from each other, depending upon the butterfly calculations with respect to which data combinations in which stages. The larger the FFT point number N becomes, the larger the sorts of orthogonal functions $W^n$ are required.

Generally, as orthogonal functions in a calculation of an N-point FFT, $W^n$ are employed in the calculation at a first stage, $W^{2n}$ are employed in the calculation at a second stage, and $W^{2k-1}n$ are employed in the calculation at a k-th stage. In this case, symbol $W^n$ indicates a complex number defined by formula (3). For instance, the orthogonal function at the first stage may be expressed by using trigonometric functions as follows:

$$W^n = \cos(2\pi n/N) + j \sin(2\pi n/N) \quad (4).$$

The FFT orthogonal functions amount to N expressed by formula (4) are generally prepared in a ROM. However, when the value of N is small, the precalculated values of weighting coefficients may be stored in a ROM table. When the value of N becomes large, the scale of this ROM table similarly becomes large. Therefore, there is a problem that such a large-scaled ROM table would impede a compactness and a higher integration of this ROM table.

SUMMARY OF THE INVENTION

The present invention has been made to solve the above-described problem, and therefore has an object such that orthogonal functions during orthogonal transformations can be produced in higher precision by a small-scaled circuit.

An orthogonal function generating circuit according to the first aspect of the present invention comprises: first data holding means for holding first data; second data holding means for holding second data; first multiplying means for multiplying the first data held in the first data holding means by a first coefficient; second multiplying means for multiplying the first data held in the first data holding means by a second coefficient; third multiplying means for multiplying the second data held in the second data holding means by a third coefficient; fourth multiplying means for multiplying the second data held in the second data holding means by a fourth coefficient; adding means for adding an output of the first multiplying means to an output of the third multiplying means and for outputting the result of addition so as to feed back the result of addition to the first data holding means; and subtracting means for subtracting an output of the second multiplying means from an output of the fourth multiplying means, and for outputting the result of subtraction so as to feed back the result of subtraction to the second data holding means.

An orthogonal function generating method according to the present invention comprises the steps of: holding a first data in a first data holding means; holding second data in a second data holding means; multiplying the first data by a first coefficient by a first multiplying means; multiplying the first data by a second coefficient by a second multiplying means; multiplying the second data by a third coefficient by a third multiplying means; multiplying the second data by a fourth coefficient by a fourth multiplying means; adding the result of multiplying the first data by the first coefficient to the result of multiplying the second data by the third coefficient by an adding means; feeding back the result of addition to the first data holding means as the first data; subtracting the result of multiplying the first data by the second coefficient from the result of multiplying the second data by the fourth coefficient by an subtracting means; and feeding back the result of subtraction to the second data holding means as the second data.

An orthogonal function generating circuit according to another aspect of the invention comprises: means for inputting a first constant value and a second constant value; and calculation means for performing a calculation on the basis of a real part $I^{n-1}$ and an imaginary part $Q^{n-1}$ of the orthogonal function $W^{n-1}$, and the first and second constant values, whereby a real part $I^n$ and an imaginary part $Q^n$ of the orthogonal function are calculated.

In the orthogonal function generating circuit and the orthogonal function generating method according to present invention, the result of multiplying the first data by the first coefficient is added to the result of multiplying the second data by the third coefficient, and the result of addition is fed back as the first data; and the result of multiplying the first data by the second coefficient is subtracted from the result of multiplying the second data by the fourth coefficient, and the result of subtraction is fed back as the second data.

BRIEF DESCRIPTION OF THE DRAWINGS

For a better understanding of the present invention, reference is made of the detailed description to be read in conjunction of the drawings, in which.

DETAILED DESCRIPTION OF THE PREFERRED EMBODIMENTS

Referring now to drawings, a description will be made of an orthogonal function generating circuit and an orthogonal function generating method according to the present invention.

A principle of the present invention is such that the above-described formula (4) is sequentially calculated by performing a recursive calculation. In other words, the calculation is carried out by employing the addition theorem of the trigonometric function indicated by the following formulae:

$$\sin(2\pi n/N)=\sin[2\pi(n-1)/N]\cos(2\pi n/N)+\cos[2\pi(n-1)/N]\sin(2\pi/N) \quad (5)$$

$$\cos(2\pi n/N)=\cos[2\pi(n-1)/N]\cos(2\pi/N)-\sin[2\pi(n-1)/N]\sin(2\pi/N) \quad (6)$$

where $\sin(2\pi/N)$ and $\cos(2\pi/N)$ may be given as constants when the point number N of the FFT are determined. The above-described formula (5) and formula (6) imply that if $\sin[2\pi(n-1)/N]$ and $\cos[2\pi(n-1)/N]$ are obtained, then $\sin(2\pi n/N)$ and $\cos(2\pi n/N)$ can be obtained. This indicates that the real part and the imaginary part of the formula (4) can be successively obtained by way of the recursive calculations.

Figure 1:
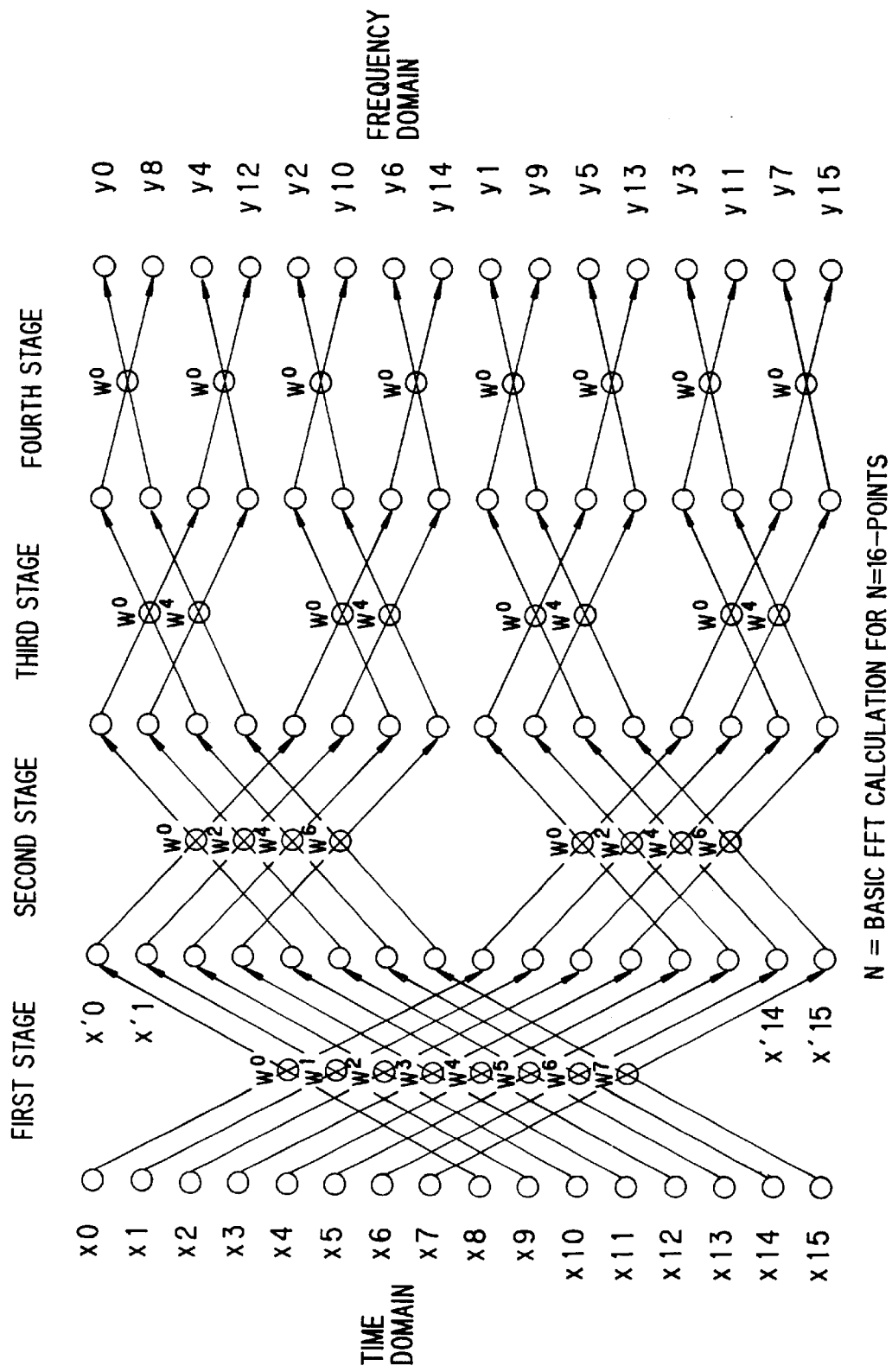
FIG. 1 is a schematic diagram explaining the FFT algorithm.
Figure 2:
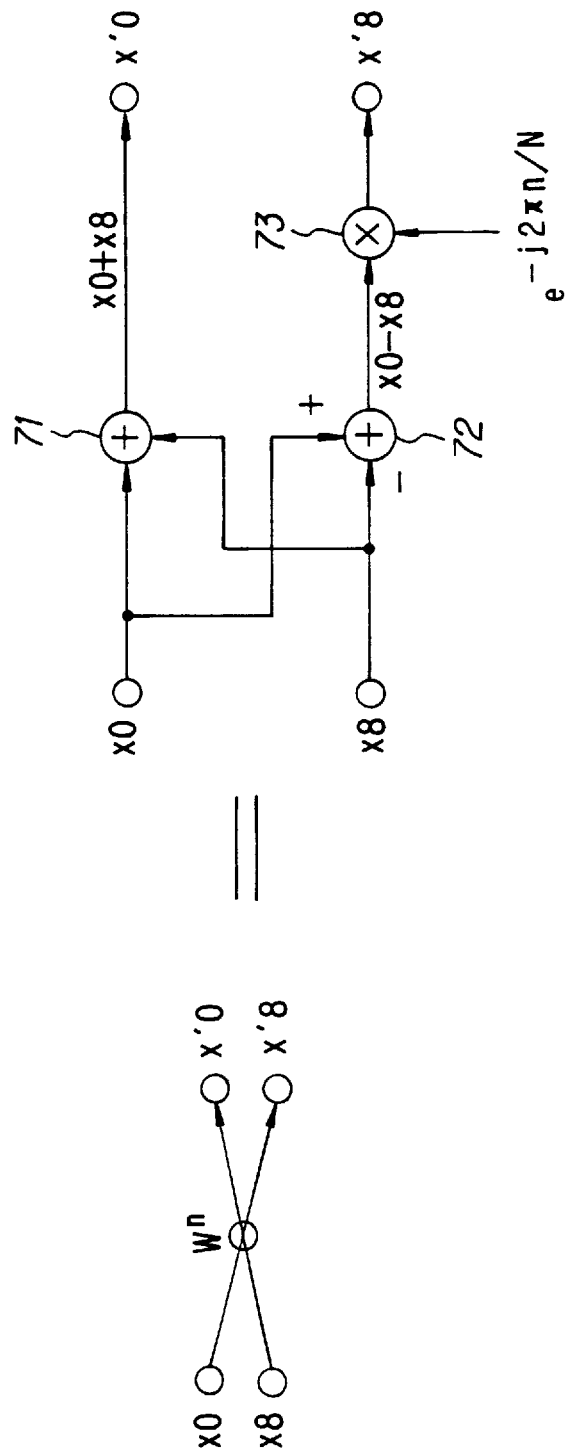
FIG. 2 is a schematic diagram explaining the butterfly calculation.
Figure 3:
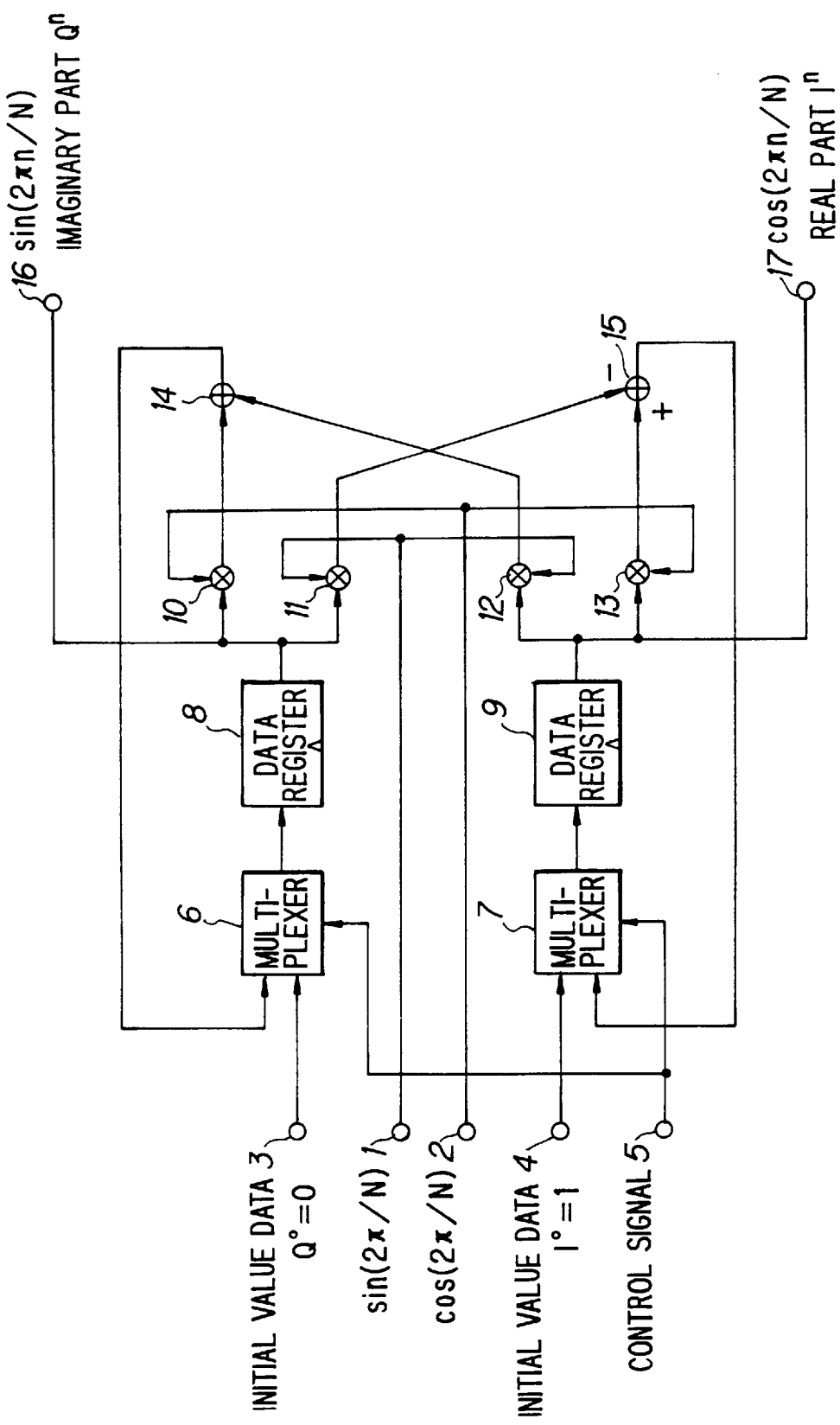
FIG. 3 is a block diagram schematically showing an orthogonal function generating circuit according to an embodiment of the present invention.

FIG. 3 schematically shows an arrangement of an orthogonal function generating circuit according to an embodiment of the present invention. A constant "$\sin(2\pi/N)$" is inputted into a constant input terminal 1, and this constant is supplied to multipliers 11 and 12. Another constant "$\cos(2\pi/N)$" is inputted to a constant input terminal 2, and this constant is supplied to multipliers 10 and 13.

The multiplier 10 multiplies an output of a data register 8 by the constant $\cos(2\pi/N)$ supplied from the constant input terminal 2 and outputs the multiplied result to an adder 14. The multiplier 11 multiplies the output of the data register 8 by the constant $\sin(2\pi/N)$ supplied from the constant input terminal 1 and outputs the multiplied output to a subtracter 15.

The multiplier 12 multiplies an output of a data register 9 with the constant $\sin(2\pi/N)$ supplied from the constant input terminal 1 and outputs the multiplied result to an adder 14. The multiplier 13 multiplies the output of the data register 9 by the constant $\cos(2\pi/N)$ supplied from the constant input terminal 3 and outputs the multiplied output to a subtracter 15.

A multiplexer 6 selects one of initial value data (being 0 in this embodiment) entered from an initial value data input terminal 3 and an output from the adder 14 according to instructions of a control signal inputted from a control signal input terminal 5, and supplies the selected data to the data register 8. Another multiplexer 7 selects one of initial value data (being 1 in this embodiment) entered from an initial value data input terminal 4 and the output from the subtracter 15 according to instructions of the control signal inputted from the control signal input terminal 5, and outputs the selected data to a data register 9.

The data held in the data register 8 is outputted from an output terminal 16 for the imaginary part of the orthogonal function, whereas the data held in the data register 9 is outputted from an output terminal 17 for the real part of the orthogonal function.

Operations of this orthogonal function generating circuit will now be explained. It should be noted that 0 and 1 are respectively inputted as the initial value data from the initial value data input terminals 3 and 4. These values correspond to such values when n=0 (sin0=0 and cos0=1) in the above-described formulae (5) and (6). When an initializing instruction signal is entered from the control signal input terminal 5, the initial value data supplied form the initial value data input terminals 3 and 4 are supplied via the multiplexers 6 and 7 to the data registers 8 and 9, respectively, so as to be stored therein. Then, the orthogonal functions 0 and 1 (initial values) when n=0 are outputted from the output terminals 16 and 17.

The values of $\sin(2\pi/N)$ and $\cos(2\pi/N)$ are supplied to the input terminals 1 and 2, respectively. These value may be predetermined as constants when the point number N of FFT is defined.

The $\sin(2\pi/N)$ and $\cos(2\pi/N)$ supplied from the input terminals 1 and 2 are multiplied by the outputs derived from the data registers 8 and 9 in the multipliers 10 to 13. Then, the above-mentioned formulae (5) and (6) are calculated with the outputs derived from the multipliers 10 to 13 by employing the adder 14 and the subtracter 15. Furthermore, the results of addition and subtraction are respectively supplied to another input terminal of the multiplexers 6 and 7. The control signal from the control signal input terminal 5 is inputted into these multiplexers 6 and 7 in order to select the outputs from the adder 14 and the subtracter 15, and then the calculation results are stored in the data registers 8 and 9. As a result, the orthogonal functions with respect to n=1 are stored into the data registers 8 and 9, and furthermore, an imaginary part $Q^1$ and a real part $I^1$ of the orthogonal function when n=1 are outputted from the output terminals 16 and 17.

That is, generally speaking, when the values of $\sin[2\pi(n-1)/N]$ and $\cos[2\pi(n-1)/N]$ are respectively stored in the corresponding data registers 8 and 9, the output of the data register 8 which the value of $\sin[2\pi(n-1)/N]$ is stored to the multipliers 10 an 11, and the output from the data register 9 into which the value of $\cos[2\pi(n-1)/N]$ is stored is supplied to the multipliers 12 and 13. To the multipliers 11 and 12, the value of $\sin(2\pi/N)$ is supplied as the constant from the constant input terminal 1, and to the multipliers 10 and 13, the value of $\cos(2\pi/N)$ is supplied as the constant from the constant input terminal 2.

As a result, the first term $(\sin[2\pi(n-1)/N] \cdot \cos 2\pi/N)$ of the right-hand side in formula (5) is calculated in the multiplier 10, whereas the second term $(\cos[2\pi(n-1)/N] \cdot \sin 2\pi/N)$ of the right-hand side in this formula (5) is calculated in the multiplier 12. The outputs from these multipliers 10 and 12 are added with each other in the adder 14, and $\sin(2\pi n/N)$ in the left-hand side in this formula (5) is obtained as the result of this addition.

Similarly, the first term $(\cos[2\pi(n-1)/N] \cdot \cos 2\pi/N)$ of the right-hand side in formula (6) is calculated in the multiplier 13, whereas the second term $(\sin[2\pi(n-1)/N] \cdot \sin 2\pi/N)$ of the right-hand side in this formula (6) is calculated in the multiplier 11. The output from the multiplier 11 is subtracted from that from the multiplier 13 in the subtracter 15, and $\cos(2\pi n/N)$ in the left-hand side in this formula (6) is obtained as the subtracted result.

Then, the outputs from these adder 14 and subtracter 15 are respectively fed back via the multiplexers 6 and 7 to the data registers 8 and 9 and are again stored therein, so that the calculations of the above-explained formulae (5) and (6) are carried out in the recursive manner.

Figure 4:
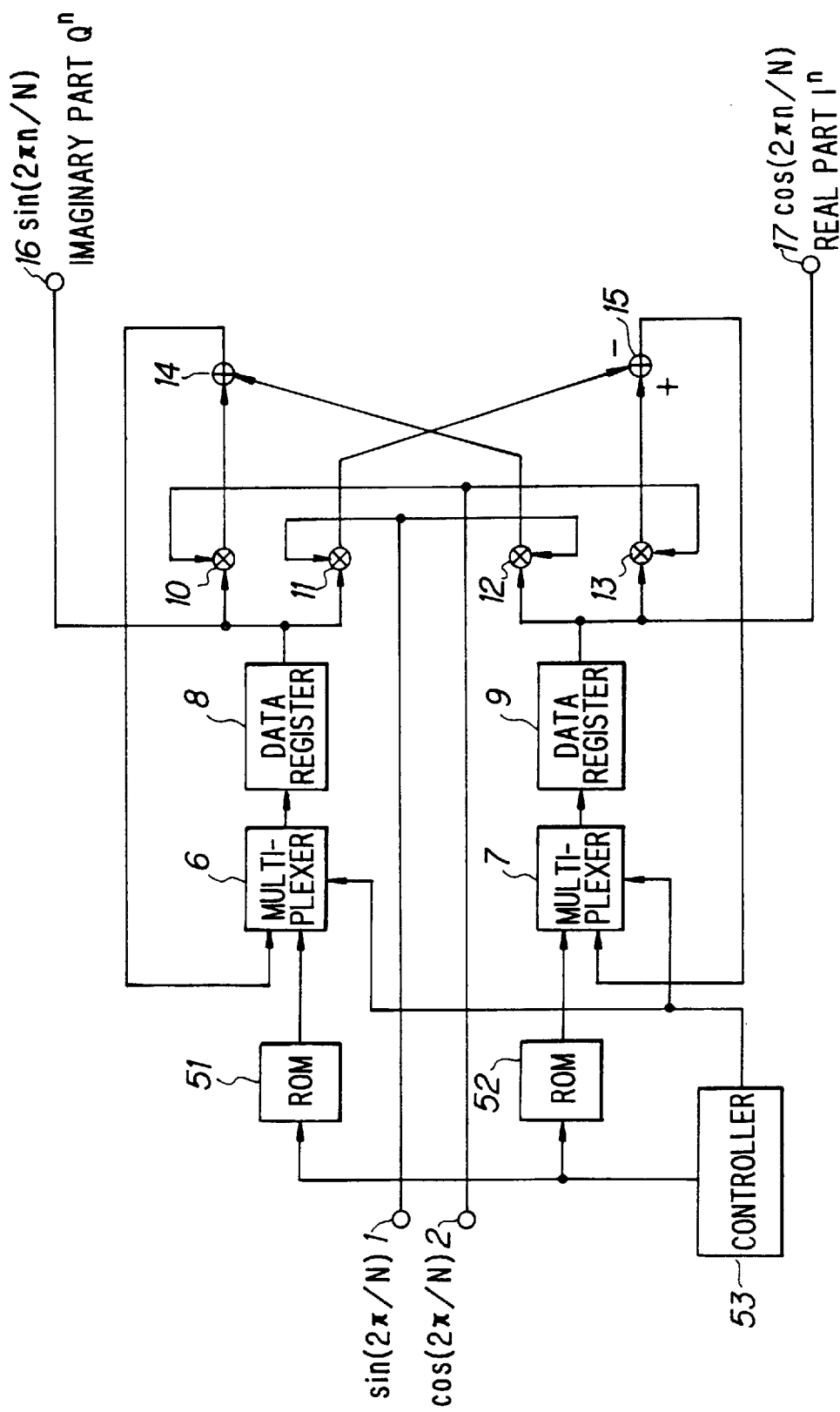
FIG. 4 is a block diagrams schematically showing an orthogonal function generating circuit according to another embodiment of the present invention.

In the first embodiment shown in FIG. 3, the orthogonal functions are successively calculated in the recursive manner. When the calculation error is present, the subsequent data is calculated on the basis of the data containing the calculation errors, so that the calculation errors are accumulated. As a method for eliminating this calculation error, a method of supplying precalculated data to the data registers 8 and 9 once per several recursive calculations so as to prevent the calculation error from being accumulated may be considered. FIG. 4 represents an arrangement of an orthogonal function generating circuit for realizing such a method as a second embodiment of the present invention.

This orthogonal function generating circuit according to this second embodiment is basically constructed similarly to that of the first embodiment of FIG. 3. However, instead of the initial value data input terminals 3 and 4 shown in FIG. 3, ROMs 51 and 52 are employed into which precalculated data have been stored, and a controller 53 is connected to these ROMs, instead of the control signal input terminal 5 in FIG. 3.

The controller 53 controls the multiplexers 6 and 7 according to the value of n in formula (4), and also controls addresses of the ROMs 51 and 52. That is, the controller 53 feeds back outputs from the adder 14 and the subtracter 15 via the multiplexers 6 and 7 to the data registers 8 and 9, and supplies the precalculated new data from the ROMs 51 and 52 to the multiplexers 6 and 7 once per several recursive calculation. The controller 53 also generates control signals so as to make the multiplexers 6 and 7 select the outputs from the ROMs 51 and 52. With such a structure, the accumulation of errors can be canceled every time the outputs from the ROMs 51 and 52 are respectively fetched via the multiplexers 6 and 7 into the registers 8 and 9.

Figure 5:
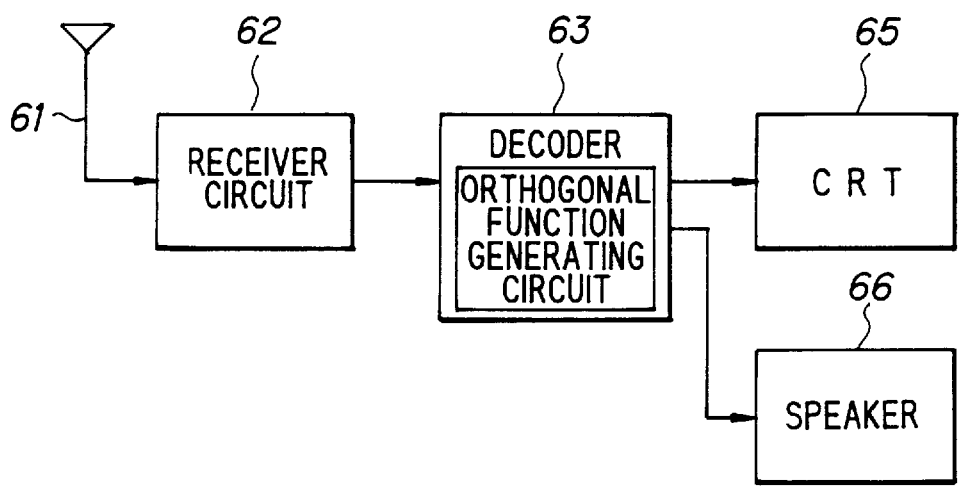
FIG. 5 is a block diagram schematically showing an arrangement of a receiver apparatus to which a data processing apparatus according to the present invention has been applied.

FIG. 5 shows an application example of the above-described orthogonal function generating circuit. In this embodiment, both of a video signal and an audio signal are digitalized and the digital video/audio data are encoded in accordance with the MPEG system in a broadcasting station not shown. In general, in the encoding process, the video data and the audio data are encoded with a high efficiency by using the orthogonal transformation such as DCT (discrete cosive transform). Then, the data encoded with a high efficiency is transmitted through, for example, the broadcasting satellite or the communication satellite to a receiver apparatus with an arrangement shown in FIG. 5, which is installed in each home.

In each receiver apparatus, the electromagnetic wave is received via an antenna 61 by a receiver circuit 62, and the received signal is outputted to a decoder 63. The decoder 63 contains the orthogonal function generating circuit 64 as shown in FIG. 3 or FIG. 4. The high efficiency encoding process is carried out by utilizing this orthogonal function generating circuit 64. Then, the decoded signal outputted from the decoder 63 is supplied to a CRT 65 so as to be displayed thereon, and is reproduced from a speaker 66 as sounds.

It should be understood that although both of the DFT (discrete Fourier transform) and the FFT (fast Fourier transform) are employed and the trigonometric functions are used as the orthogonal function system, the present invention may also be applied to orthogonal function generating circuits for other orthogonal function systems such as the discrete cosine transform (DCT) and the discrete sine transform (DST).

As previously described in detail, in accordance with the orthogonal function generating circuit and the orthogonal function generating method in the present invention, the product of the first data multiplied by the first coefficient is added to the product of the second data multiplied by the fourth coefficient, and the added result is fed back as the first data, and the product of the second data multiplied by the third coefficient is subtracted from the product of the first data multiplied by the second coefficient, and the subtracted result is fed back as the second data. Accordingly, the recursive calculation is able to provide a circuit with considerably reduced scale, and the orthogonal functions can be generated in higher precision.

What is claimed is:

1. An orthogonal function generating circuit for generating an orthogonal function used in an orthogonal transformation between time domain digital data and frequency domain digital data for obtaining said time domain digital data from said frequency domain digital data and for obtaining said frequency domain digital data from said time domain digital data, said orthogonal function generating circuit comprising:

first data holding means for holding first data;

second data holding means for holding second data;

first multiplying means for multiplying said first data by a first coefficient;

second multiplying means for multiplying said first data by a second coefficient;

third multiplying means for multiplying said second data by said second coefficient;

fourth multiplying means for multiplying said second data by said first coefficient;

adding means for adding an output of said first multiplying means to an output of said third multiplying means and for outputting an addition result, said addition result being fed back to said first data holding means; and subtracting means for subtracting an output of said second multiplying means from an output of said fourth multiplying means, and for outputting a subtraction result, said subtraction result being fed back to said second data holding means.

2. An orthogonal function generating circuit as claimed in claim 1 further comprising:

first selecting means for selecting one of a first set value and said addition result and supplying a selected result to said first data holding means; and second selecting means for selecting one of a second set value and said subtraction result and supplying a selected result to said second data holding means.

3. An orthogonal function generating circuit as claimed in claim 2 wherein:

said first set value corresponds to 0, and said second set value corresponds to 1.

4. An orthogonal function generating circuit as claimed in claim 2, further comprising:

first storage means for storing said first set value;

second storage means for storing said second set value; and selection control means for letting said first selecting means and said second selecting means respectively select said first set value and said second set value at a predetermined timing.

5. An orthogonal function generating circuit as claimed in claim 1 wherein:

said first data corresponds to an imaginary number, and said second data corresponds to a real number.

6. An orthogonal function generating method for generating an orthogonal function used in an orthogonal transformation between time domain digital data and frequency domain digital data for obtaining said time domain digital data from said frequency domain digital data and for obtaining said frequency domain digital data from said time domain digital data, said orthogonal function generating circuit comprising the steps of:

holding first data in a first data holding means;

holding second data in a second data holding means;

multiplying said first data by a first coefficient;

multiplying said first data by a second coefficient;

multiplying said second data by said second coefficient;

multiplying said second data by said first coefficient;

adding a result of multiplying said first data by said first coefficient to a result of multiplying said second data by said second coefficient;

feeding back an addition result to said first data holding means as said first data;

subtracting a result of multiplying said first data by said second coefficient from a result of multiplying said second data by said first coefficient; and feeding back said subtraction result to said second data holding means as said second data.

7. An orthogonal function generating method a claimed in claim 6 wherein:

one of a first set value and said addition result is selected and held as said first data; and one of a second set value and said subtraction result is selected and held as said second data.

8. An orthogonal function generating method as claimed in claim 7 wherein:

said first set value corresponds to 0, and said second set value corresponds to 1.

9. An orthogonal function generating method as claimed in claim 7 wherein:

said first set value and said second set value are stored; and said stored first and second set values are selected and respectively held as said first and second data.

10. An orthogonal function generating method as claimed in claim 6 wherein:

said first data corresponds to an imaginary number, and said second data corresponds to a real number.

11. An orthogonal function generating circuit for generating an orthogonal function $W^n$ used in an orthogonal transformation, comprising:

means for inputting a first constant value and a second constant value;

calculation means for performing a calculation based on a real part $I^{n-1}$ and an imaginary part $Q^{n-1}$ of said orthogonal function $W^{n-1}$ and said first and second constant values in order to calculate a real part $I^n$ and an imaginary part $Q^n$ of said orthogonal function; and means for inputting an initial value $I^0$ of a real part of said orthogonal function $W^n$ and an initial value $Q^0$ of an imaginary part thereof, wherein said calculating means outputs a result of subtracting a result of multiplying said imaginary part $Q^{n-1}$ of said orthogonal function $W^{n-1}$ by said second constant from a result of multiplying said real part $I^{n-1}$ of said orthogonal function $W^{n-1}$ by said first constant as said real part $I^n$ of said orthogonal function $W^n$ and feeds back said result of subtracting to said means for inputting as said initial value $I^0$, and outputs a result of adding a result of multiplying said imaginary part $Q^{n-1}$ of said orthogonal function $W^{n-1}$ by said first constant to a result of multiplying said real part $I^{n-1}$ of said orthogonal function $W^{n-1}$ by said second constant as said imaginary part $Q^n$ of said orthogonal function $W^n$ and feeds back said result of adding to said means for inputting as said initial value $Q^0$.

12. An orthogonal function generating circuit as claimed in claim 11 wherein said calculating means comprises:

means for inputting an initial value $I^o$ of the real part of said orthogonal function $W^n$ and an initial value $Q^o$ of the imaginary part thereof.

13. An orthogonal function generating circuit as claimed in claim 11 wherein:

said initial value $I^0$ of said real part of said orthogonal function $W^n$ is equal to 1, and said initial value $Q^0$ of said imaginary part thereof is equal to 0.

14. An orthogonal function generating circuit as claimed in claim 11 wherein:

said calculating means outputs the result of subtracting the result of multiplying said imaginary part $Q^{n-1}$ of said orthogonal function $W^{n-1}$ by said second constant from the result of multiplying the real part $I^{n-1}$ of said orthogonal function $W^{n-1}$ by said first constant as the real part $I^n$ of said orthogonal function $W^n$, and outputs the result of adding the result of multiplying said imaginary part $Q^{n-1}$ of said orthogonal function $W^{n-1}$ by said first constant to the result of multiplying said real part $I^{n-1}$ of said orthogonal function $W^{n-1}$ by said second constant as the imaginary part $Q^n$ of the orthogonal function $W^n$.

* * * * *